July 25, 1944.   B. ROBINSON   2,354,221
STOVE
Filed July 24, 1942   2 Sheets-Sheet 1

INVENTOR.
Bestor Robinson
BY
L. F. Hammond
ATTORNEY

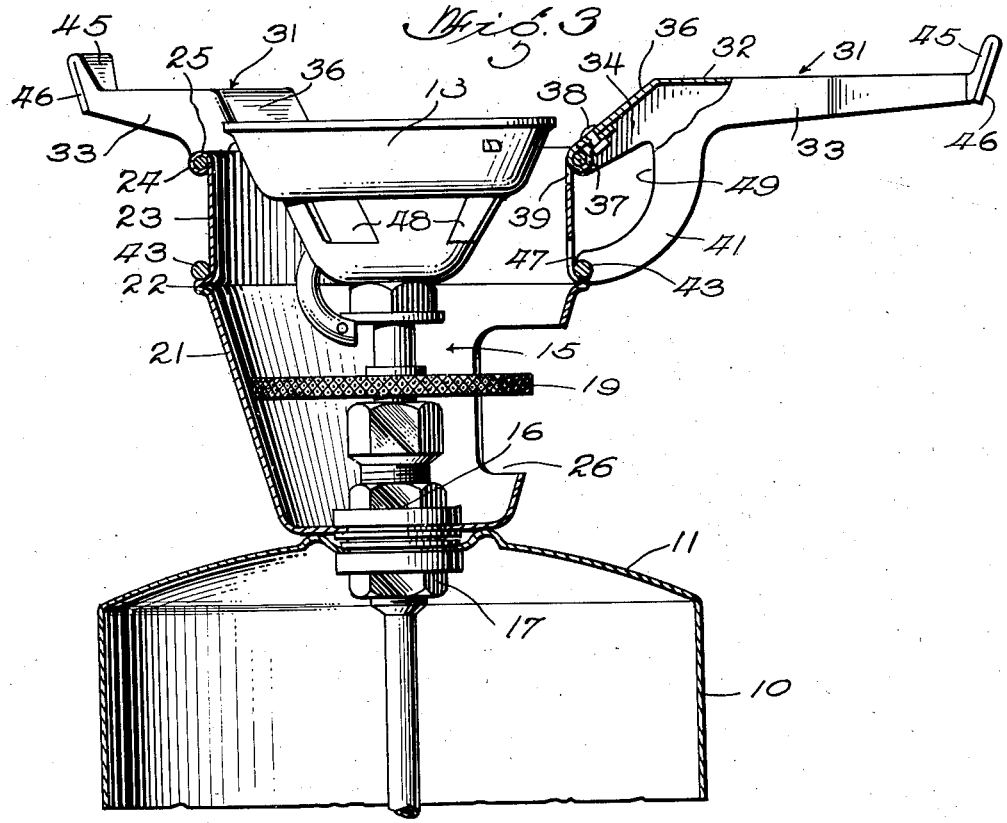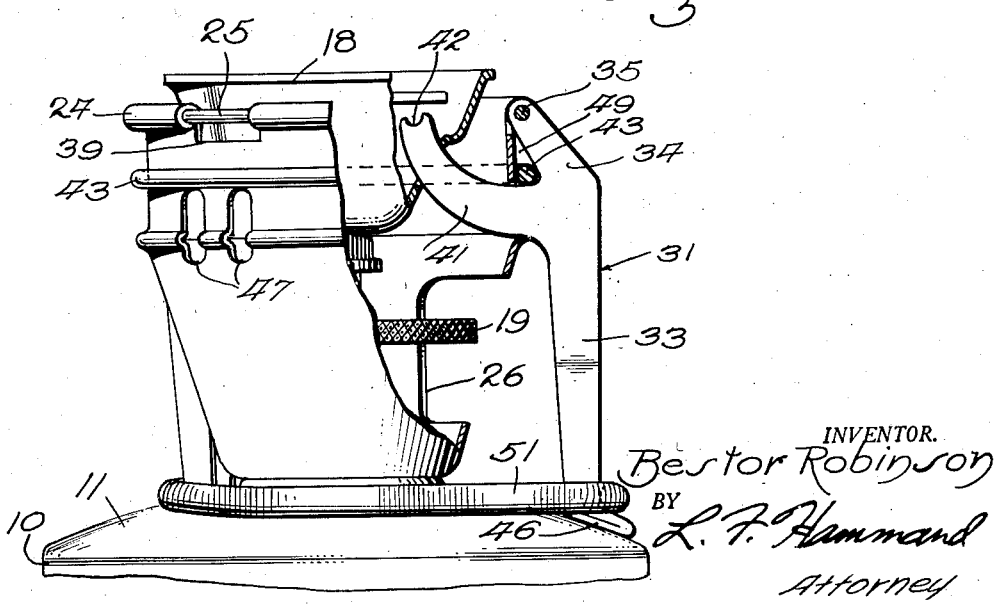

Patented July 25, 1944

2,354,221

UNITED STATES PATENT OFFICE 2,354,221

STOVE

Bestor Robinson, United States Army, Oakland, Calif.

Application July 24, 1942, Serial No. 452,147

12 Claims. (Cl. 126—38)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to stoves, and more specifically to a miniature gasoline stove having a collapsible utensil support arranged to hold cooking vessels in position immediately above the stove burner.

The principal object of the invention resides in the provision of a collapsible utensil supporting means comprising a plurality of radial brackets extending outwardly from the burner housing of the stove and of simple compact arrangement so that the brackets may be folded downwardly into nested position with respect to the burner housing when the stove is not in use.

A further object of the invention resides in the provision of a collapsible utensil supporting means including a plurality of radially extending brackets, each permanently pivoted to the burner housing and arranged for easy manipulation between an operating and inoperative position, and locking means common to all of the brackets and adapted to maintain each of them in extended position.

A further object of the invention resides in the provision of a miniature stove including a cylindrical fuel reservoir, a fuel burner on the top of the reservoir, and a burner housing surrounding the burner, together with utensil supporting means comprising a plurality of separate and independent brackets pivotally mounted on the upper rim of the burner housing and arranged to be extended horizontally to provide a support for a cooking vessel, or to be shifted into a vertical position closely nested around the burner housing so as to provide an unusually compact stove assembly, and in such manner as to protect the mechanism of the burner when in folded position.

Another object of the invention resides in the provision of a utensil supporting bracket of simple compact arrangement such that the bracket may be formed of a single, unitary piece of sheet metal, and will provide a smooth, flat top surface having no crevices that might collect food spilled on the top of the bracket, and consequently easy to keep clean.

A further object of the invention resides in the provision of a collapsible utensil supporting means including a plurality of radially extending brackets, each permanently pivoted to the burner housing and arranged for easy manipulation between an operating and inoperative position, and a slip ring encircling the burner housing and adapted to maintain each of them in extended operating position, or to be shifted to an inoperative position to permit the brackets to be nested against the housing. These and other important objects are accomplished by the structure illustrated in the accompanying drawings wherein Fig. 1 is a side elevational view of the miniature gasoline stove, constructed in accordance with the teachings of the present disclosure.

Fig. 3 is a central sectional view of the burner housing showing the utensil supporting means in operating position, and Fig. 4 is a side elevational view, partly in section, of the burner housing showing the utensil supporting means in folded inoperative position.

Figure 1:
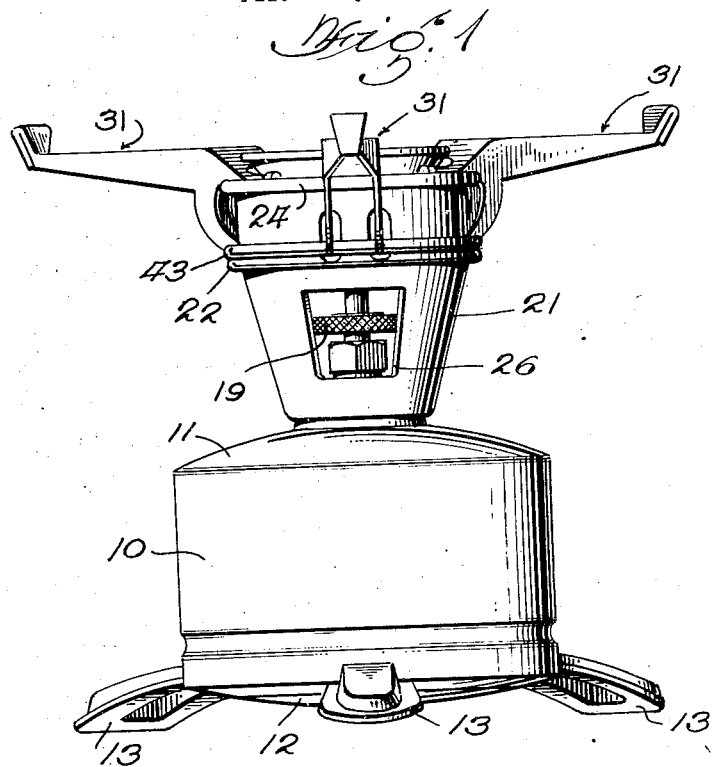

The stove includes a fuel reservoir 10 which, in the structure illustrated, consists of a generally cylindrical body having a raised, convex top portion 11 and provided with a bottom 12 to which a plurality of hinged stove legs 13 are secured. The legs 13 are pivoted so that they may be folded inwardly from the positions shown to assume nested positions against the lower surface of the stove bottom 12 when the stove is collapsed for packing.

A burner assembly 15 is mounted on the top 11 of the fuel reservoir by a pair of clamping nuts 16 and 17. The burner 15 includes a burner cup 18 in which the burner jet, not shown, is housed, and a control wheel 19 is provided in order to control the fuel supply to the burner jet.

A burner housing 21 surrounds the burner assembly and is secured to the fuel reservoir 10 by the nuts 16 and 17. The housing includes a lower tapered portion extending upwardly from the top of the fuel reservoir to a bead 22, and an upper cylindrical portion 23 extending from the bead 22 to a top rolled edge 24. The rolled edge 24 encircles a reinforcing wire ring 25, provided to strengthen the upper edge of the burner housing, and to act as a pivot for the utensil supporting brackets, as will be hereinafter described. The burner housing 21 includes one or more side openings 26 to permit manual manipulation of the control wheel 19 of the burner.

The burner housing is provided with a utensil supporting structure consisting of three utensil supporting brackets, generally indicated at 31. Each of these consists of a single unitary piece of sheet metal stamped and formed to include a relatively flat top portion 32 folded downwardly along its opposite edges to provide downwardly extending side flanges 33 to give additional strength to the bracket. The arrangement is such that the entire top of the bracket is entirely flat, smooth, imperforate, and without any recesses or other places in which food might lodge if accidentally spilled on the bracket. The inner end of each of the side flanges 33 includes an offset portion 34 extending angularly downward from the bracket and terminating in a rounded end having a perforation 35. The inner end of the flat top portion 32 is bent downwardly at an angle corresponding with the angle of the offsets 34 to provide an inclined flat section 36 having its lower end looped around the wire 25 as indicated at 37 and riveted in place by a rivet 38, and the opposite sides of the section 36 are united with the upper edges of the offsets 34, so that these parts cooperate to form a smooth unobstructed surface.

Figure 2:
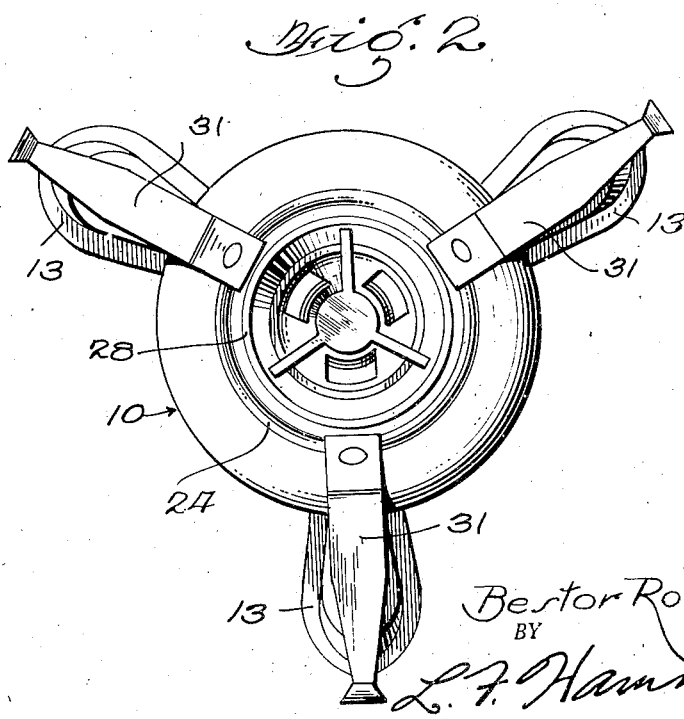
Fig. 2 is a plan view thereof.

The brackets 31 are each pivoted on the upper marginal edge of the burner housing. To accomplish this the upper rolled edge 24 of the burner housing is notched at 39 to expose the wire 25, and the wire 25 is passed through the openings 35 and loop 37, so that each bracket is pivoted on the wire and permanently secured to the burner housing. Each of the flanges 33 also include a supporting brace 41 extending downwardly from the bracket and curving inwardly to terminate in a notched locking seat 42. A wire retaining ring 43 is loosely mounted on the cylindrical upper portion 23 of the burner housing to engage with the locking seats 42 of each of the brackets and maintain the brackets in extended position as illustrated in Figures 1, 2, and 3. In this position the ring forms an abutment for the braces of the bracket and the brackets cooperate to provide a flat horizontal supporting surface slightly above the plane of the burner cup 18 so that a cooking vessel may be placed on the stove and held in proper position over the cooking burner.

The outer ends of each of the brackets 31 include an upwardly extending raised end 45 to limit the outward movement of a cooking vessel on the bracket, and the raised end 45 is doubled back at 46 to close the end of the bracket and to provide a flat bearing, to engage the top of the fuel reservoir, as shown in Fig. 4. The brackets 31 are arranged to be pivoted downwardly from the position shown in Fig. 3 to the inoperative nested position shown in Fig. 4. To permit this operation, slots 47 are provided in the burner housing 21 and slots 48 are provided in the burner cup 18. When the bracket 31 is pivoted downwardly the downwardly extending curved braces 41 will enter the slots 47 and the slots 48, and assume the position illustrated in Fig. 4.

To permit such action, however, it is necessary to disengage the retainer ring 43 from the locking seats 42. To this end, clearance slots 49 are provided between the pivot openings 35 of the bracket and the supporting seats 42. The individual brackets may be pivoted downwardly by raising the retaining ring 43 above the slots 47 and allowing the brackets to fall downwardly by gravity until the outer flat bearing portions 46 of the brackets contact the raised, convex surface 11 of the fuel reservoir (see Fig. 4). When the individual brackets are in this position it will be apparent that they project on three sides of the burner housing and offer protection against rough handling or accidental impacts against the housing. Further, since each of the brackets 31 bears firmly against the upper surface of the housing of the fuel reservoir, these serve to reinforce the burner housing structure so that it will not be likely to be damaged by rough handling or abuse incident to use in the field.

It will be understood, of course, that since the individual brackets will maintain themselves in nested position by gravity, it is not entirely essential to provide any auxiliary means to retain them in nested relationship with the burner, but it is contemplated that a small coil spring 51 may be snapped around the lower ends of the brackets so that they will be retained in position irrespective of the position of the stove.

From the foregoing it will be seen that by following the teachings of the present invention a novel collapsible utensil support may be provided for a miniature stove that possesses marked advantages of those known in the prior art in that it is of unusual mechanical simplicity and may be manipulated with ease.

Further, the arrangement is such that all essential parts are permanently inter-connected and cannot become lost or separated from each other, yet they may be folded into extremely compact nested relationship so as to occupy a minimum of space when not in use. In addition, it may be seen that the utensil supporting means illustrated in the present application serves to surround and protect the burner structure when the device is not in use. Further, when the stove is being used these brackets present a smooth, flat upper surface, devoid of any places for food or foreign substances to lodge, so that they may be easily cleaned in the event that food is inadvertently spilled on the top of the stove.

It is believed pertinent to mention, in passing, that the preferred embodiment of the device, as illustrated in the present drawings, has been developed particularly for use in the United States Army and has been adopted by the Army as representative of a structure having highly desirable military characteristics, but the utility of the present invention is believed to extend to commercial and civilian adaptations as well as military uses.

Further, the drawings of the present application illustrate the details of a present preferred embodiment of the invention that is believed to best typify the teachings of this disclosure; but it is believed that the invention is capable of some alterations and modifications without departing from the invention's spirit. It is accordingly requested that the scope of the present invention be regarded as limited only by the scope of the language of the appended claims.

Having thus described my invention, what I claim as new and desire to secure by Letters Patent is:

1. In a miniature stove, the combination of a fuel reservoir, a burner, a burner housing, and utensil supporting means arranged to be selectively positioned in an operating position wherein the means are adapted to support a cooking utensil above the stove burner and in an inoperative position wherein the supporting means lie in nested position close to the burner housing and reservoir, the supporting means including an upper portion of said housing comprising a rolled bead and reenforcing wire within said bead, a plurality of notches in the bead portion of the housing at regular intervals around its periphery to leave the reenforcing wire exposed, a pivoted supporting bracket associated with each of said notches, said brackets being pivoted on the aforementioned wire and including a utensil supporting arm and a supporting brace below the utensil supporting arm and terminating in a locking seat, a shiftable ring member mounted on the burner housing and arranged to be engaged by each of the said seats to maintain all of the brackets in generally horizontal extended position, and perforations in the burner housing corresponding with each of the brackets to receive the supporting braces thereof and to thus permit the brackets to be pivoted downwardly in nested relationship with the burner housing.

2. In a miniature stove, the combination of a fuel reservoir, a burner, a burner housing, and utensil supporting means arranged to be selectively positioned in an operating position wherein the means are adapted to support a cooking utensil above the stove burner and in an inoperative position wherein the supporting means lie in nested position close to the burner housing and reservoir, the supporting means including an upper portion of said housing comprising a rolled bead and reenforcing wire within said bead, a plurality of notches in the bead portion of the housing at regular intervals around its periphery to leave the reenforcing wire exposed, a pivoted supporting bracket associated with said wire at each of said notches, said brackets consisting of a single unitary piece of relatively thin sheet metal including a smooth, flat top surface and a pair of downwardly extending side flanges on each side of said top surface, each of said flanges including an offset portion extending angularly downwardly with respect to the side flange and terminating in a pivot opening adjacent its lower end, an extension portion at the end of the flat top portion adjacent the offset portions, said extension lying in an angular relationship to the smooth, flat top and in a position corresponding to the upper edges of the aforementioned offset portions and extending between said offset portions, to form a smooth inclined pivot end for the bracket, a curved brace element contiguous with and lying in the same plane as each of the side flanges, a locking seat at the lower end of each of said braces, and a shiftable ring mounted on the burner housing and common to all the brackets and arranged to engage the locking seats of each of the braces to maintain the brackets in extended position.

3. In a miniature stove, the combination of a fuel reservoir, a burner, a burner housing, and utensil supporting means arranged to be selectively positioned in an operating position wherein the means are adapted to support a cooking utensil above the stove burner and in an inoperative position wherein the supporting means lie in nested position close to the burner housing and reservoir, the supporting means comprising pivots on the upper portion of said housing, a supporting bracket associated with each of said pivots, means to permit the brackets to be pivoted downwardly in nested relationship with the burner housing, or to maintain all of the brackets in generally horizontal extended position, perforations in the burner housing corresponding with each of the brackets to receive portions thereof when the brackets are pivoted downwardly in nested relationship with the burner housing, and an elastic band adapted to extend around the burner housing and exert resilient force simultaneously urging all of the said supporting brackets inwardly to nested position.

4. In a miniature stove, the combination of a fuel reservoir, a burner, a burner housing, and utensil supporting means arranged to be selectively positioned in an operating position wherein the means are adapted to support a cooking utensil above the stove burner and in an inoperative position wherein the supporting means lie in nested position close to the burner housing and reservoir, the supporting means comprising pivots on the upper portion of said housing, a supporting bracket having an utensil supporting arm associated with each of said pivots, a brace below the utensil supporting arm and including a locking seat, a shiftable ring member mounted on the burner housing and arranged to be engaged by each of the said seats to maintain all of the brackets in generally horizontal extended position, the burner housing having perforations corresponding with each of the brackets to receive the braces thereof and to thus permit the brackets to be pivoted downwardly in nested relationship with the burner housing, and means to engage the outer end of each of the bracket arms and limit their inward pivotal movement to locate the brackets in clustered position around the burner housing.

5. In a miniature stove, the combination of a fuel reservoir, a burner, a burner housing of generally cylindrical formation extending a substantial distance above the fuel reservoir, and utensil supporting means arranged to be selectively positioned in an operating position wherein the means are adapted to support a cooking utensil above the stove burner and in an inoperative position wherein the supporting means lie in nested position close to the burner housing and reservoir, the supporting means including an upper portion of said housing comprising a rolled bead and reenforcing wire within said bead, a plurality of notches in the bead portion of the housing at regular intervals around its periphery to leave the reenforcing wire exposed, a pivoted supporting bracket associated with each of said notches, said bracket being pivoted on the aforementioned wire and including a utensil supporting arm and a supporting brace below the utensil supporting arm and including a locking seat, means to maintain all of the brackets in generally horizontal extended position and to permit the brackets to be pivoted downwardly in nested relationship with the burner housing, and a raised portion on the fuel reservoir positioned to be engaged by the outer end of each of the bracket arms to limit their inward pivotal movement.

6. In a miniature stove, the combination of a fuel reservoir, a burner, a burner housing, and utensil supporting means arranged to be selectively positioned in an operating position wherein the means are adapted to support a cooking utensil above the stove burner and in an inoperative position wherein the supporting means lie in nested position close to the burner housing and reservoir, the supporting means including an upper portion of said housing comprising a rolled bead and reenforcing wire within said bead, a plurality of notches in the bead portion of the housing at regular intervals around its periphery to leave the reenforcing wire exposed, a pivoted supporting bracket associated with each of said notches, said bracket including a pivotal opening adapted to pivot on the aforementioned wire and a utensil supporting arm and locking means to maintain all of the brackets in generally horizontal extended position or to permit the brackets to be pivoted downwardly in nested relationship with the burner housing.

7. In a miniature stove, the combination of a fuel reservoir, a burner, a burner housing, and utensil supporting means arranged to be selectively positioned in an operating position wherein the means are adapted to support a cooking utensil above the stove burner and in an inoperative position wherein the supporting means lie in nested position close to the burner housing and above the reservoir, the supporting means comprising a plurality of pivoted supporting brackets, each of said brackets including a pivot, a utensil supporting arm, and a brace including a locking seat, a shiftable ring member surrounding the burner and arranged to be engaged by each of the said locking seats to maintain all of the brackets in generally horizontal extended position, said ring being vertically shiftable on the burner housing to permit the brackets to be pivoted downwardly in nested relationship with the burner housing when the locking ring is lifted above the locking seats.

8. In a miniature stove, the combination of a fuel reservoir, a burner, a burner housing, and utensil supporting means arranged to be selectively positioned in an operating position wherein the means are adapted to support a cooking utensil above the stove burner and in an inoperative position wherein the supporting means reenforce the burner housing, the supporting means comprising pivots on the upper portion of said housing, a supporting bracket associated with each of said pivots, a shiftable member arranged to be engaged by each of the said supporting brackets to maintain all of the brackets in generally horizontal extended position, or to permit the brackets to be pivoted downwardly with respect to the burner housing, and a raised portion on the fuel reservoir positioned to be engaged by the outer end of each of the bracket arms to support the ends of the bracket arms and thus reenforce the structure of the burner housing.

9. As an article of manufacture, a sheet metal supporting bracket consisting of a single unitary piece of relatively thin sheet metal including a smooth, flat top surface and a pair of downwardly extending side flanges on each side of said top surface, each of said flanges including an offset portion extending angularly downwardly with respect to the side flange and terminating in a pivot opening adjacent its lower end, an extension portion at the end of the flat top portion adjacent the offset portions, said extension lying in an angular relationship to the smooth, flat top and in a position corresponding to the upper edges of the aforementioned offset portions and forming an eye lying between the pivoted openings of the offset portions, to form a smooth inclined pivot end for the bracket, and a curved brace contiguous with and lying in the same plane as each of the side flanges, together with a supporting seat at the lower end of each of said braces, and a clearance slot between the pivot opening and the supporting seat.

10. As an article of manufacture, a base member and a sheet metal supporting bracket, said bracket consisting of a single unitary piece of relatively thin sheet metal including a smooth, flat top surface and a pair of downwardly extending side flanges on each side of said top surface, each of said flanges including an offset portion extending angularly downwardly with respect to the side flange and terminating in a pivot opening adjacent its lower end, an extension portion at the end of the flat top portion adjacent the offset portions, said extension lying in an angular relationship to the smooth, flat top and in a position corresponding to the upper edges of the aforementioned offset portions extending between said offset portions, to form a smooth inclined pivot end for the bracket, and a curved brace contiguous with and lying in the same plane as each of the side flanges, together with a supporting seat at the lower end of each of said braces, said base having means engaging said pivot openings and a movable abutment engaging said brace supporting seats when the bracket is in supporting position.

11. As an article of manufacture a support comprising a panel member having a bracket pivoted thereon, said bracket comprising a sheet metal member formed into a substantially U-shaped arm pivoted at one of its ends to the panel member, said member having an apertured portion adjacent the pivot point and an abutment movable over the apertured portion of said panel, said bracket arm having a brace attached to the intermediate portion thereof and engaging the abutment when it over-lies the apertured portion to maintain the arm in supporting postion, but passing through the apertured portion of the panel to allow the arm to swing toward the panel member when the abutment is shifted.

12. As an article of manufacture, a support comprising an upright tubular member, a plurality of brackets pivoted thereon adjacent the upper end, each bracket comprising a supporting arm pivoted at one of its ends to said member, said member having apertures beneath said pivot points, and a slidable ring adapted to bar said apertures or to be shifted to open them, said brackets each having a brace attached to the intermediate portion of the arm and engaging the ring when it overlies the apertures to maintain the arms in supporting position but passing through the apertures to bring the arms into lowered position when the ring is shifted.

BESTOR ROBINSON.